(12) United States Patent
Pardasani et al.

(10) Patent No.: US 11,422,569 B2
(45) Date of Patent: Aug. 23, 2022

(54) SYSTEMS AND METHODS FOR GENERATING A MISSION FOR A SELF-DRIVING MATERIAL-TRANSPORT VEHICLE

(71) Applicant: Clearpath Robotics Inc., Kitchener (CA)

(72) Inventors: Utsav Pardasani, Kitchener (CA); Daniel Cantor, Waterloo (CA); David William Bergsma, Brampton (CA); Kenneth James Sherk, Ayr (CA); Matthew Kingston Bedard, Cambridge (CA); Matthew Allen Rendall, Waterloo (CA); Ryan Christopher Gariepy, Kitchener (CA)

(73) Assignee: Clearpath Robotics Inc., Kitchener (CA)

( * ) Notice: Subject to any disclaimer, the term of this patent is extended or adjusted under 35 U.S.C. 154(b) by 109 days.

(21) Appl. No.: 16/118,590

(22) Filed: Aug. 31, 2018

(65) Prior Publication Data

US 2019/0064845 A1 Feb. 28, 2019

Related U.S. Application Data

(60) Provisional application No. 62/552,728, filed on Aug. 31, 2017.

(51) Int. Cl.
*G05D 1/02* (2020.01)
*G05D 1/00* (2006.01)
*G05B 19/418* (2006.01)

(52) U.S. Cl.
CPC ..... *G05D 1/0282* (2013.01); *G05B 19/41895* (2013.01); *G05D 1/0088* (2013.01);
(Continued)

(58) Field of Classification Search
CPC .......... G05B 19/41895; G05D 1/0282; G05D 1/0088; G05D 1/0225; G05D 1/0297
See application file for complete search history.

(56) References Cited

U.S. PATENT DOCUMENTS

| | | |
|---|---|---|
| 5,023,790 A | 6/1991 | Luke, Jr. |
| 6,315,513 B1 | 11/2001 | Hurukawa et al. |

(Continued)

FOREIGN PATENT DOCUMENTS

WO 2011146259 A2 11/2011

OTHER PUBLICATIONS

Wikipedia Vehicular Automation, https://web.archive.org/web/20140402022211/https://en.wikipedia.org/wiki/vehicular_automation, retrieved by Archive.org on Apr. 2, 2014 (Year: 2014) (3 pages).

(Continued)

*Primary Examiner* — Abdhesh K Jha
(74) *Attorney, Agent, or Firm* — Bereskin & Parr LLP/S.E.N.C.R.L., s.r.l.

(57) ABSTRACT

Systems and methods for generating a mission for a self-driving material-transport vehicle are presented. The system comprises at least one self-driving material-transport vehicle, at least one programmable logic controller, at least one field instrument, and at least one non-transitory computer-readable medium in communication with at least one processor. An application signal is received from the programmable logic controller based on an activation signal from the field instrument. A mission is generated by the application signal and a mission template, and the mission is transmitted to the self-driving material-transport vehicle. In some cases, the application signal may be based on OPC-UA, and the mission and/or mission template may be based on a REST protocol.

20 Claims, 5 Drawing Sheets

(52) U.S. Cl.
CPC ......... *G05D 1/0225* (2013.01); *G05D 1/0297* (2013.01); *G05B 2219/31086* (2013.01); *G05B 2219/50393* (2013.01); *G05D 2201/0216* (2013.01)

(56) References Cited

U.S. PATENT DOCUMENTS

| | | |
|---|---|---|
| 6,463,360 B1 | 10/2002 | Terada et al. |
| 7,693,757 B2 | 4/2010 | Zimmerman |
| 8,190,295 B1 | 5/2012 | Garretson et al. |
| 8,634,981 B1 | 1/2014 | Hyde et al. |
| 8,694,193 B2 | 4/2014 | Makela et al. |
| 9,114,440 B1 | 8/2015 | Colucci et al. |
| 9,280,153 B1 | 3/2016 | Palamarchuk et al. |
| 9,465,388 B1 | 10/2016 | Fairfield et al. |
| 9,486,917 B2 | 11/2016 | Reid et al. |
| 9,487,356 B1 | 11/2016 | Aggarwal |
| 9,632,502 B1 | 4/2017 | Levinson et al. |
| 9,928,749 B2 | 3/2018 | Gil et al. |
| RE47,108 E * | 10/2018 | Jacobus et al. |
| 10,112,771 B2 * | 10/2018 | D'Andrea et al. |
| 10,317,119 B2 | 6/2019 | Zou |
| 10,328,769 B2 | 6/2019 | Ferguson et al. |
| 10,577,199 B2 | 3/2020 | Lee et al. |
| 2002/0154974 A1 | 10/2002 | Fukuda et al. |
| 2004/0158355 A1 | 8/2004 | Holmqvist et al. |
| 2005/0216126 A1 | 9/2005 | Koselka et al. |
| 2007/0106306 A1 | 5/2007 | Bodduluri |
| 2007/0294029 A1 * | 12/2007 | D'Andrea ............ G05D 1/0246 701/410 |
| 2008/0183599 A1 * | 7/2008 | Hill ........................ G06Q 99/00 705/28 |
| 2009/0012667 A1 | 1/2009 | Matsumoto et al. |
| 2009/0043440 A1 | 2/2009 | Matsukawa et al. |
| 2010/0021272 A1 | 1/2010 | Ward et al. |
| 2010/0030417 A1 | 2/2010 | Fang et al. |
| 2010/0030466 A1 * | 2/2010 | Rogers ..................... G08G 1/20 701/533 |
| 2010/0049391 A1 | 2/2010 | Nakano |
| 2010/0106356 A1 | 4/2010 | Trepagnier et al. |
| 2010/0206651 A1 | 8/2010 | Nagasaka |
| 2010/0316470 A1 | 12/2010 | Lert et al. |
| 2012/0173018 A1 | 7/2012 | Allen et al. |
| 2012/0197464 A1 | 8/2012 | Wang et al. |
| 2012/0296471 A1 | 11/2012 | Inaba et al. |
| 2013/0054133 A1 | 2/2013 | Lewis et al. |
| 2013/0086215 A1 | 4/2013 | Trotta et al. |
| 2013/0226340 A1 | 8/2013 | Buchstab |
| 2013/0231779 A1 | 9/2013 | Purkayastha et al. |
| 2014/0040431 A1 * | 2/2014 | Rao .................... G06F 16/2282 709/219 |
| 2014/0244004 A1 | 8/2014 | Scott et al. |
| 2014/0309833 A1 | 10/2014 | Ferguson et al. |
| 2015/0088310 A1 | 3/2015 | Pinter et al. |
| 2015/0217455 A1 | 8/2015 | Kikkeri et al. |
| 2015/0248131 A1 | 9/2015 | Fairfield et al. |
| 2015/0352721 A1 | 12/2015 | Wicks et al. |
| 2016/0086494 A1 | 3/2016 | Anandayuvaraj et al. |
| 2016/0101940 A1 | 4/2016 | Grinnell et al. |
| 2016/0246301 A1 | 8/2016 | Kazama et al. |
| 2016/0271800 A1 | 9/2016 | Stubbs et al. |
| 2016/0327951 A1 | 11/2016 | Walton et al. |
| 2017/0039765 A1 | 2/2017 | Zhou et al. |
| 2017/0100837 A1 | 4/2017 | Zevenbergen et al. |
| 2017/0113352 A1 | 4/2017 | Lutz et al. |
| 2017/0168488 A1 | 6/2017 | Wierzynski et al. |
| 2017/0308096 A1 | 10/2017 | Nusser et al. |
| 2018/0001474 A1 | 1/2018 | Sinyavskiy et al. |
| 2018/0009000 A1 | 1/2018 | Shang et al. |
| 2018/0060765 A1 | 3/2018 | Hance et al. |
| 2018/0086575 A1 | 3/2018 | Mccarthy et al. |
| 2018/0362270 A1 | 12/2018 | Clucas et al. |
| 2020/0047343 A1 | 2/2020 | Bal et al. |
| 2020/0206928 A1 | 7/2020 | Denenberg et al. |

OTHER PUBLICATIONS http://www.digitalglobe.com/downloaded on May 6, 2014 (3 pages).

* cited by examiner

SYSTEMS AND METHODS FOR GENERATING A MISSION FOR A SELF-DRIVING MATERIAL-TRANSPORT VEHICLE

CROSS-REFERENCE TO RELATED APPLICATIONS

This application claims priority from U.S. Provisional Patent Application No. 62/552,728, filed 31 Aug. 2017, and titled "SYSTEMS AND METHODS FOR GENERATING A MISSION FOR A SELF-DRIVING MATERIAL-TRANSPORT VEHICLE", the contents of which are incorporated herein by reference for all purposes.

TECHNICAL FIELD

The described embodiments relate to systems and methods for generating a mission for a self-driving material-transport vehicle.

BACKGROUND

Self-driving material-transport vehicles are used to move payloads such as parts and inventory throughout industrial facilities such as factories and warehouses. In the case of autonomous vehicles, which have a higher degree of automation than automated guided vehicles ("AGVs"), it is necessary to provide the autonomous vehicle with a mission that specifies, for example, a pick-up location or payload to be picked up, and a destination location where a payload is to be dropped off, among other parameters.

Conventional systems require human intervention in the creation of missions for autonomous vehicles. Typically, in the deployment of a fleet of autonomous material-transport vehicles, a human operator programs and schedules the missions to be executed by the vehicles in the fleet.

With the benefits of industrial automation being known, there remains a need for the automatic generation of missions for autonomous self-driving material-transport vehicles.

SUMMARY

In a first aspect, there is a system for instructing a self-driving material-transport vehicle. The system comprises a programmable logic controller ("PLC"), a field instrument, and a non-transitory computer-readable medium, all in communication with at least one processor. The medium stores computer-executable instructions that, when executed by the at least one processor, configure the at least one processor to receive an application signal from the programmable logic controller based on an activation signal from the field instrument, generate a mission based on the application signal, and transmit the mission to the self-driving material-transport vehicle.

Accord to some embodiments, the system further comprises the self-driving material-transport vehicle in communication with the at least one processor.

According to some embodiments, the instructions further comprise instructions that, when executed, configure the at least one processor to select a mission template based on the application signal, and the mission is based on the mission template and the application signal.

According to some embodiments, the application signal is based on open-sourced C universal architecture ("OPC-UA").

According to some embodiments, the mission template is based on a representational state transfer ("REST" or "RESTFul") protocol.

According to some embodiments, the system further comprises a smart pick-up-and-drop-off stand comprising the field instrument.

In a second aspect, there is a method for instructing a self-driving material-transport vehicle. The method comprises receiving an application signal from a programmable logic controller, generating a mission based on the application signal, and transmitting the mission to the self-driving material-transport vehicle. The application signal is based on an activation signal from a field instrument.

According to some embodiments, the method further comprises the step of executing the mission with the self-driving material-transport vehicle.

According to some embodiments, the application signal is based on an OPC-UA protocol.

According to some embodiments, the method further comprises the step of selecting a mission template based on the application signal, prior to generating the mission. The mission is generated based on the mission template and the application signal.

According to some embodiments, the activation signal comprises a field-instrument identifier, and generating the mission comprises determining a mission location based on the field-instrument identifier.

According to some embodiments, the method further comprises the preliminary step of receiving the activation signal from the field instrument with the programmable logic controller.

According to some embodiments, the field instrument is part of a smart pick-up-and-drop-off stand, such that the activation signal is generated by the smart pick-up-and-drop-off stand based on a change in a payload on the smart pick-up-and-drop-off stand.

In a third aspect, there is a non-transitory computer-readable storage medium. The medium stores computer-executable instructions that, when executed by a processor, configure the processor to perform operations. The operations comprise receiving an application signal from an industrial control system, generating a mission based on the application signal, and transmitting the mission to the self-driving material-transport vehicle. The application signal is based on an activation signal from a field instrument.

According to some embodiments, the instructions further comprise instructions that, when executed, configure the processor to select a mission template based on the application signal. The operation of generating the mission is based on the application signal and the mission template.

According to some embodiments, the application signal is based on OPC-UA.

According to some embodiments, the mission template is based on a REST protocol.

BRIEF DESCRIPTION OF THE DRAWINGS

A preferred embodiment of the present invention will now be described in detail with reference to the drawings, in which.

DETAILED DESCRIPTION

Modern industrial facilities such as factories and warehouses commonly include programmable logic controllers ("PLCs") and industrial control system, for example, employing a supervisor control and data acquisition ("SCADA") system. The SCADA systems typically allow a human operator to program and monitor an industrial process. As such, the SCADA system and PLCs provide and receive data that pertains to the state of the industrial process, for example, as obtained by field equipment involved in the process.

As further described herein, the data provided and received by industrial control systems can be used to automatically generate missions for autonomous self-driving material-transport vehicles. However, problems have also been discovered in the design and implementation of such a solution. For example, the data used by PLCs and industrial control systems is typically simple input/output data (e.g. in respect of a PLC) that merely relates to variables and associated values. As used herein, this type of data is referred to "I/O" data.

In contrast, fleet-management systems require higher-level data, for example, in order to call particular functions, handle complex data strings, and/or generate and handle sequences of operations. Therefore, it is necessary to utilize the I/O data of the PLCs and industrial control systems along with the higher-level data of the fleet-management system in order to automatically generate missions based on the state of an industrial process.

Figure 1:
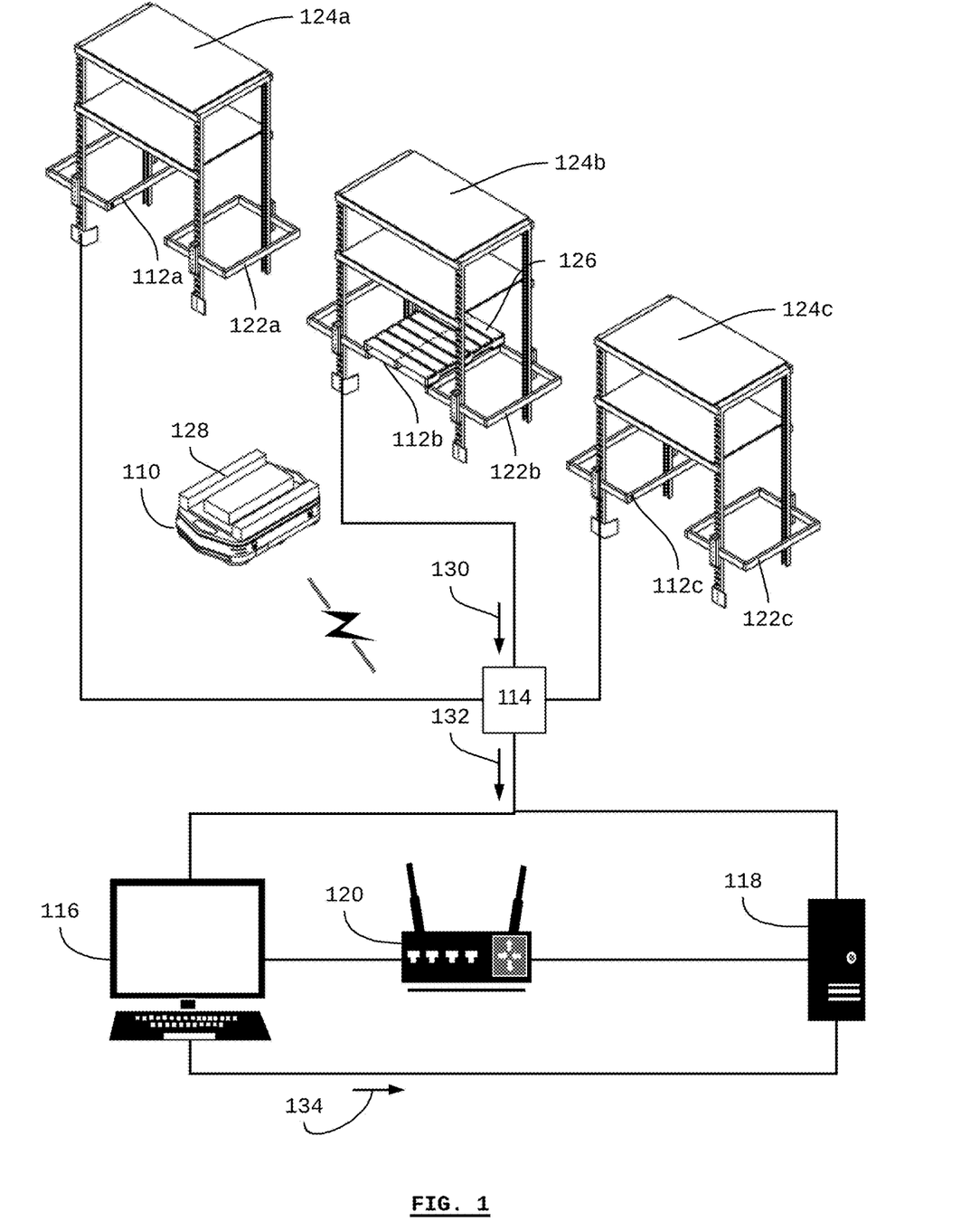
FIG. 1 is a network diagram of a system for instructing self-driving material-transport vehicles according to some embodiments.

Referring to FIG. 1, there is shown a system 100 for instructing self-driving material-transport vehicles. The system includes a self-driving material-transport vehicle 110, a field instrument 112a, and a PLC 114.

The PLC 114 is in communication with the field instrument 112a, and may be in communication with at least one of a computer terminal 116 and a computer server 118. The system 100 may also include communications network infrastructure, such as a wireless access point 120.

The wireless access point 120 may communicate with the vehicle 110, and either or both of the computer terminal 116 and the computer server 118 may be in communication with the communications network, via a wired connection or wirelessly via the wireless access point 120.

According to some embodiments, the vehicle 110 may be one of a plurality of vehicles, for example, a fleet of vehicles. The PLC 114 may be one of a plurality of PLCs. The field instrument 112a may be one of a plurality of field instruments that include the field instruments 112b and 112c, collectively referred to as the field instrument or instruments 112. Furthermore, it is possible that any of a plurality of PLCs may be in communication with one or more of any of a plurality of computer terminals and/or computer servers.

According to some embodiments, the computer terminal 116 may be a part of an industrial control system. For example, the computer terminal 116 may be used, in part, as a SCADA system that provides an interface for a human user to monitor and control the field instruments 112 and the PLC 114 in order to monitor and control an industrial process. According to some embodiments, the server 118 may be a part of a fleet-management system that communicates with a fleet of vehicles (including the vehicle 110), for example, in order to provide information to or receive information from the vehicles, including the distribution of missions to the vehicles.

In the example shown in FIG. 1, the field instrument 112a is integrated in a pick-up-and-drop-off stand 122a, which is part of a shelf 124a. Generally, pick-up-and-drop-off stands 122a, 122b, and 122c may collectively be referred to as the pick-up-and-drop-of stands 122, and the shelves 124a, 124b, and 124c may be collectively referred to as the shelves 124.

The field instrument generally includes a sensor for generating an activation signal according to conditions sensed on or in proximity to the field instrument. In the example shown in FIG. 1, the field instrument 112 may include a sensor or switch such as a proximity sensor or limit switch for determining whether a payload, such as a pallet is present on the pick-up-and-drop-off stand 122. As shown, the pick-up-and-drop-off stand 122b holds a pallet 126, whereas the pick-up-and-drop-off stands 122a and 122c do not. According to some embodiments, the vehicle 110 may include a lift appliance 128 for lifting a payload (e.g. the pallet 126) on to or off the pick-up-and-drop-off stand 122.

According to some embodiments, the field instrument 112, for example in response to a change in the presence of a payload, communicates an activation signal 130 to the PLC 114. According to some embodiments, the PLC 114 sends a relay signal 132 based on the activation signal 130 to at least one of the computer terminal 116 and the computer server 118, which may communicate with the vehicle 110 via the wireless access point 120 in order to provide instructions for a mission to the vehicle 110. According to some embodiments, if the relay signal 116 is received by an industrial control system on the computer terminal 116, then the industrial control system may send an application signal 134 to an industrial protocol translation application. In the example shown in FIG. 1, the application signal 134 is indicated as being sent from the computer terminal 116 (e.g. industrial control system) to the server 118 (e.g. fleet-management system) implying that the industrial protocol translation application resided on the server 118. However, in any particular embodiment, the industrial protocol translation application may reside on the terminal 116, the server 118, another computer system (not shown), or on the vehicle 110.

Figure 2:
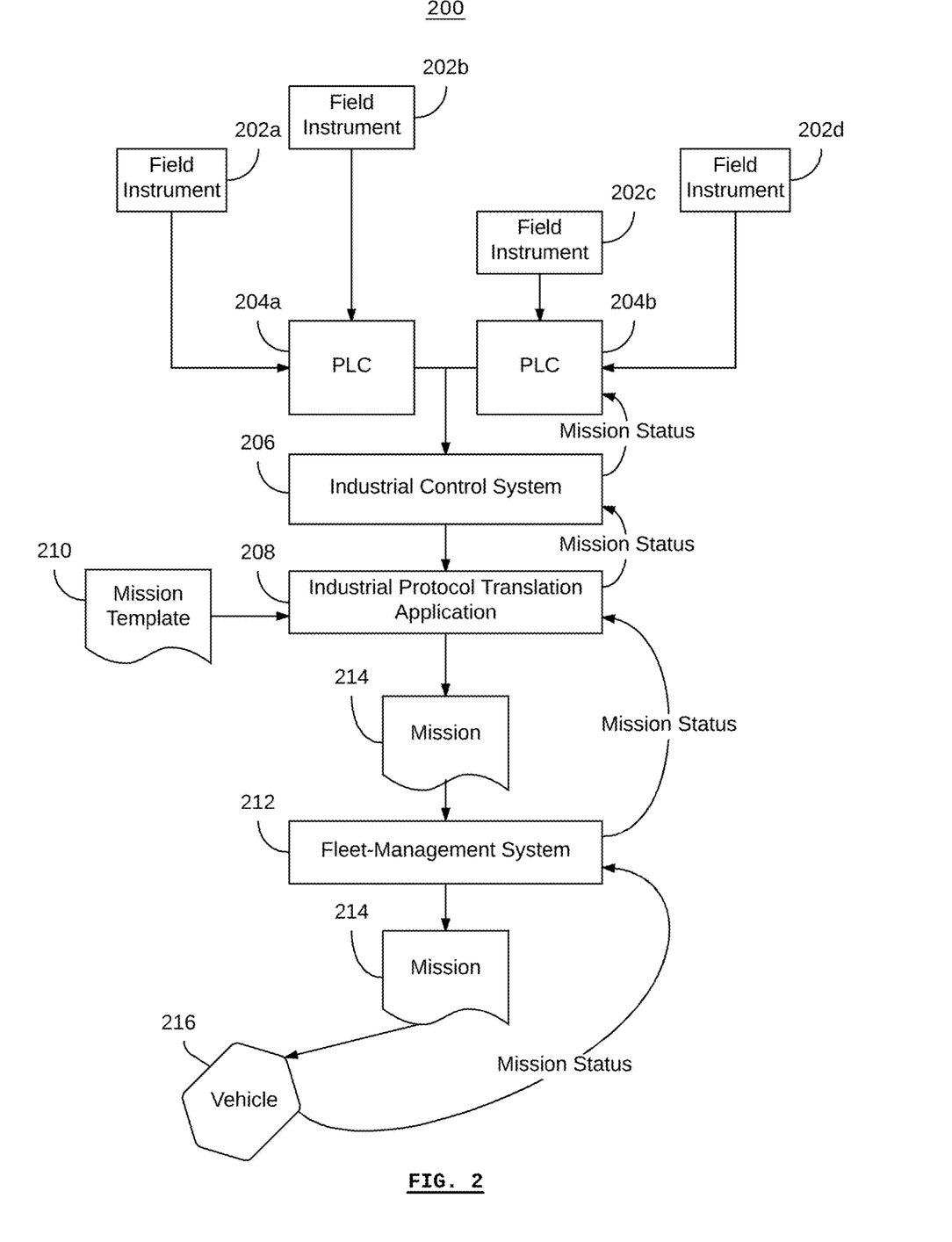
FIG. 2 is a computer system diagram of a system 200 for instructing self-driving material-transport vehicles according to some embodiments.

Referring to FIG. 2, there is shown a system 200 for instructing self-driving material-transport vehicles. According to some embodiments, the system comprises a plurality of field instruments 202a, 202b, 202c, and 202d (collectively referred to as the field instruments 202), a plurality of PLCs 204a and 204b (collectively referred to as the PLCs 204), a self-driving material-transport vehicle 216 (which may be one of a plurality of vehicles), and components 206-214 that, according to some embodiments, may be implemented using one or more computer systems, for example, in the form of computer-executable instructions or computer data stored on non-transitory computer-readable media.

According to some embodiments, any or all of the components 206-214 may be implemented using one or more computer systems that comprise any or all of the self-driving vehicle 216, a computer terminal (e.g. the computer terminal 116 that may provide an industrial control system), and a computer server (e.g. the computer server 118 that may provide a fleet-management system).

According to some embodiments, the system 200 includes an industrial control system 206 that communicates with the PLCs 204. For example, the industrial control system 206 may be (or may include) a SCADA system, for example, having a SCADA computer terminal. Each of the field instruments 202 may provide I/O data to the PLC 204 as an activation signal, which in turn, may provide I/O data to the industrial control system 206 as a relay signal.

Based on the I/O data (and, according to some embodiments, data associated with the I/O data, such as location data), the industrial control system 206 transmits an application signal to an industrial protocol translation application 208. According to some embodiments, the application signal is based on or comprises the I/O data from the relay signal and/or the activation signal. According to some embodiments, the application signal is based on an open-sourced C universal architecture ("OPC-UA") or similar protocol.

The industrial protocol translation application 208 uses the application signal and a mission template 210 to generate a mission 214. In order to generate the mission 214, the industrial protocol translation application 208 selects an appropriate mission template 210. According to some embodiments, the mission template 210 may be selected from among a plurality of mission templates based on the application signal received from the industrial control system 206.

For example, the application signal may indicate that the activation signal is associated with a specific field instrument or type of field instrument. The application signal may indicate the type of event that triggered the activation signal. Thus, in the case that the field instrument is a pick-up-and-drop-off stand, and the activation signal was triggered by a payload being placed on the pick-up-and-drop-off stand, a "pick up payload" mission template may be selected. In the event that all payloads from a particular pick-up-and-drop-off stand are to be delivered to a particular destination location, the destination location may also be included in the mission template 210. If there is more than one possible destination location, then the destination location may be defined by a variable in the mission template 210, and the value for the variable may be determined by the data in the application signal as the mission 214 is being generated.

According to some embodiments, the mission template 210 may comprise a text file. According to some embodiments, the mission template 210 may comprise string data. According to some embodiments, the mission template 210 may be based on a representational state transfer ("REST" or "RESTful") or similar protocol, web service or application-programming interface ("API").

Similarly, the industrial control system 206 may be used to query the PLCs 204 and field instruments 202 in order to determine the state of the PLCs 204 and field instruments 202. For example, if a "drop-off" mission template 214 has been selected, the industrial control system 206 can determine which pick-up-and-drop-off stands are available (i.e. empty) to receive a payload.

According to some embodiments, the mission 214 is generated and/or transmitted to the fleet manager 212 using a REST, RESTful, or similar protocol, web service or API.

Once the mission 214 has been generated, the mission 214 is dispatched to the vehicle 216 so that the vehicle 216 can execute the mission 214.

As indicated in FIG. 2, the system 200 can be used to generate a mission for a self-driving material-transport vehicle 216 based on an event at a field instrument 202, PLC 204, etc. However, the system 200 can also be used to write information to the PLCs 204 based on the status of the vehicle 216 or a mission via the industrial protocol translation application 208, as indicated by "mission status" in FIG. 2.

For example, as the vehicle 216 is executing the mission 214, the status of the mission (e.g. based on the location of the vehicle 216, the status of the vehicle 216 such as 'stopped', 'waiting', 'in progress', etc., or events at field instruments 202 or PLCs 204) can be received by the industrial protocol translation application 208. Based on the vehicle status and/or mission status, the industrial protocol translation application 208 can write information to the PLCs 204 based on the vehicle status and/or mission status. According to some embodiments, the industrial protocol translation application 208 may write information directly to the PLCs 204. According to some embodiments the industrial protocol translation application 208 may write information to the PLCs 204 via the industrial control system 208.

According to some embodiments, the industrial protocol translation application includes a heartbeat function. The heartbeat function allows the industrial control system 206 and PLCs 204 to verify the communications link with the industrial protocol translation application 208 on an ongoing basis. For example, if communications with the industrial protocol translation application 208 are lost (i.e. any of the industrial protocol translation application 208, fleet-management system 212, and the vehicle 216 are perceived to be unavailable to the industrial control system 206 and/or the PLCs 204), then the industrial control system 206 and/or the PLCs 204 can set the PLCs in a state that ensures the safe operation of the field instruments 202 until communications with the industrial protocol translation application 208 are restored.

Figure 3A:
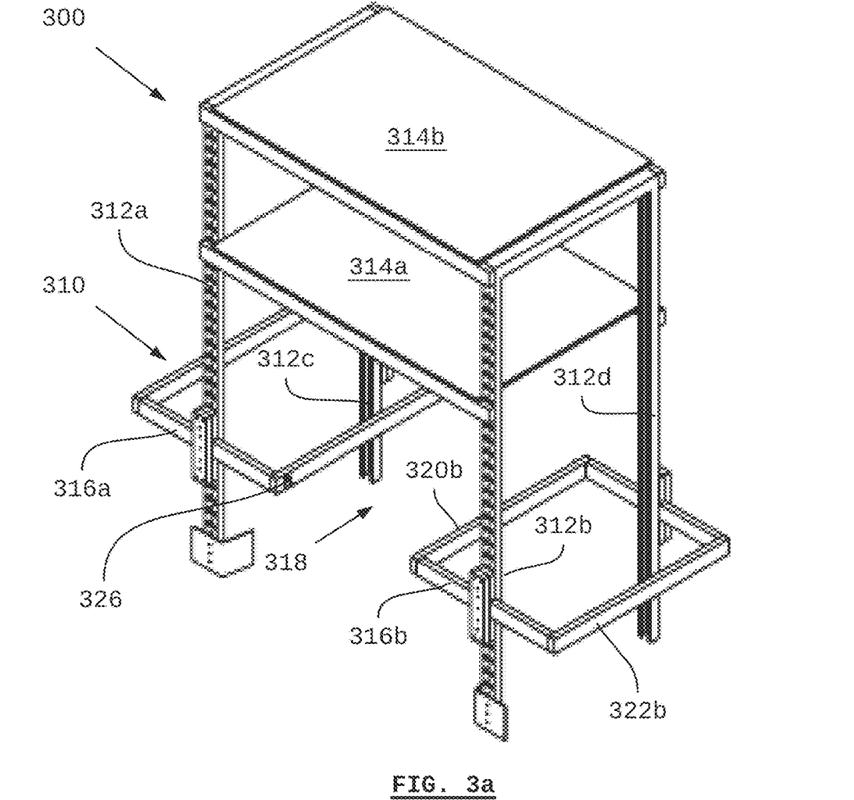
FIG. 3a is an isometric view of a storage shelf that includes a smart pick-up-and-drop-off stand according to some embodiments.

Referring to FIG. 3a, there is shown a storage shelf 300 that includes a smart pick-up-and-drop-off stand 310 according to some embodiments. The storage shelf 300 with the smart pick-up-and-drop-off stand 310 may provide several advantages. For example, combining a pick-up-and-drop-off stand with shelving may provide for an efficient allocation of floor space within an industrial facility by using the vertical space located above a pick-up-and-drop-off stand as storage space for other items.

The shelf 300 generally comprises two or more vertical support members, and, in the example shown, comprises vertical support members 312a, 312b, 312c, and 312d (collectively referred to as the vertical support members 312).

One or more shelves may be attached to the vertical members 312. In the example shown, two shelves 314a and 314b (collectively referred to as the shelves 314) are attached to the vertical members 312. Any number of shelves 314 may be attached to the vertical support members.

The smart pick-up-and-drop-off stand 310 is located below the lowest shelf 314a. In the example of FIG. 3a, the smart pick-up-and-drop-off stand 310 is shown without a payload. According to some embodiments, the smart pick-up-and-drop-off-stand 310 comprises a first cantilevered support member 316a and a second cantilevered support member 316b defining an access channel 318 there between.

According to some embodiments, each cantilevered support member, for example, cantilevered support member 316b, may comprise a payload-support member 320b and a ballast member 322b. The payload-support member 320b generally supports a payload (in concert with the payload-support member on the opposite cantilevered support member), and the ballast member 322b provides ballast to the cantilevered support member.

Figure 3B:
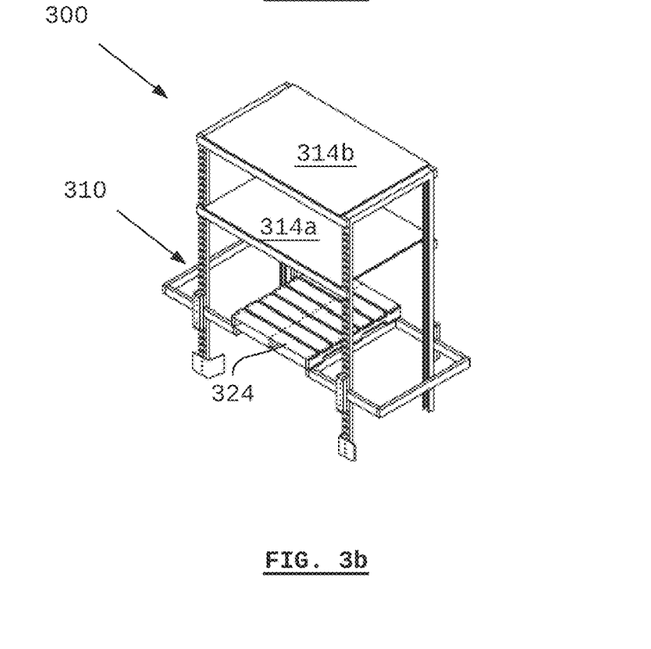
FIG. 3b is an isometric view of the storage shelf of FIG. 3a with a pallet payload on the smart pick-up-and-drop-off stand.

FIG. 3b depicts the storage shelf 300 that includes the smart pick-up-and-drop-off stand 310 shown with a pallet 324 that has been placed on the cantilevered support members as a payload.

The term "smart" is used herein to indicate that a pick-up-and-drop-off stand includes a sensor or switch such as a proximity sensor or limit switch. According to some embodiments, the smart pick-up-and-drop-off stand 310 includes a limit switch 326. The limit switch 326 may communicate with a PLC, and/or the smart pick-up-and-drop-off stand 310 may include a PLC. The limit switch 326 generally detects whether a payload (e.g. the pallet 324) is present on the smart pick-up-and-drop-off stand 310. According to some embodiments, the limit switch 326 sends an activation signal as an I/O signal to the PLC. Generally, the smart pick-up-and-drop-off stand 310, or the entire shelf 300 including the smart pick-up-and-drop-off stand may be considered a field instrument.

Figure 4:
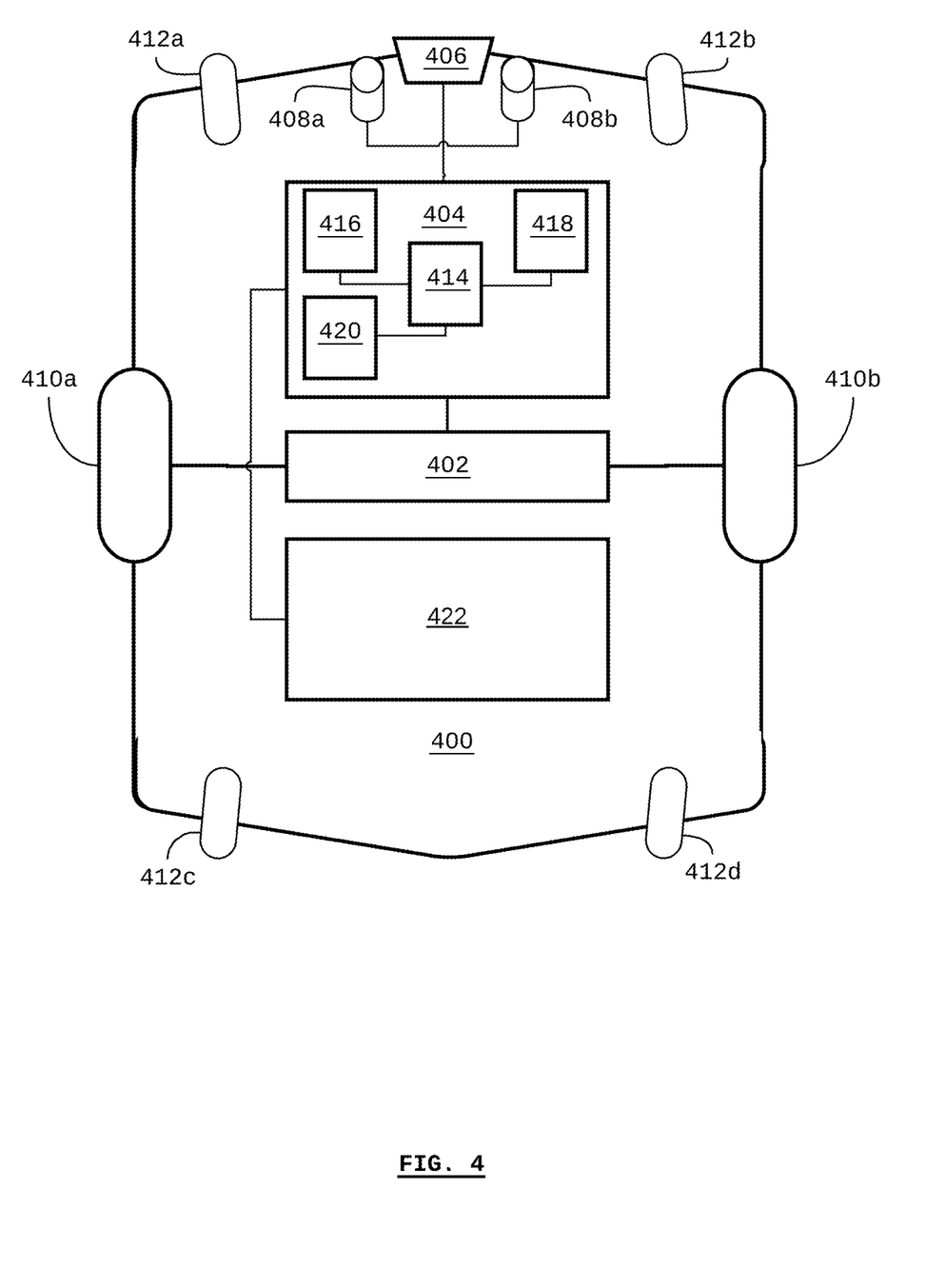
FIG. 4 is a system diagram of a self-driving material-transport vehicle including a lift appliance, according to some embodiments.

Referring to FIG. 4, there is shown a self-driving material-transport vehicle 400 according to some embodiments. The vehicle comprises a drive system 402, a vehicle control system 404, one or more sensors 406, 408a, and 408b, and a lift appliance 422.

The drive system 402 includes a motor and/or brakes connected to drive wheels 410a and 410b for driving the vehicle 400. According to some embodiments, the motor may be an electric motor, combustion engine, or a combination/hybrid thereof. Depending on the particular embodiment, the drive system 402 may also include control interfaces that can be used for controlling the drive system 402. For example, the drive system 402 may be controlled to drive the drive wheel 410a at a different speed than the drive wheel 410b in order to turn the vehicle 400. Different embodiments may use different numbers of drive wheels, such as two, three, four, etc.

According to some embodiments, additional wheels 412 may be included (as shown in FIG. 4, the wheels 412a, 412b, 412c, and 412d may be collectively referred to as the wheels 412). Any or all of the additional wheels 412 may be wheels that are capable of allowing the vehicle 400 to turn, such as castors, omni-directional wheels, and mecanum wheels.

The vehicle control system 404 comprises a processor 414, a memory 416, a computer-readable non-transitory medium 418, and a communications transceiver 120, such as a wireless transceiver for communicating with a wireless communications network (e.g. using an IEEE 802.11 protocol or similar, also known as "WiFi").

One or more sensors 406, 408a, and 408b may be included in the vehicle 400. For example, according to some embodiments, the sensor 406 may be a LiDAR device (or other optical/laser, sonar, or radar range-finding sensor). The sensors 408a and 408b may be optical sensors, such as video cameras. According to some embodiments, the sensors 408a and 408b may be optical sensors arranged as a pair in order to provide three-dimensional (e.g. binocular or RGB-D) imaging.

The vehicle control system 404 uses the medium 418 to store computer programs that are executable by the processor 414 (e.g. using the memory 416) so that the vehicle control system 404 can provide automated or autonomous operation to the vehicle 400. Furthermore, the vehicle control system 404 may also store an electronic map that represents the known environment of the vehicle 400, such as a manufacturing facility, in the media 418.

For example, the vehicle control system 404 may plan a path for the vehicle 400 based on a known destination location and the known location of the vehicle. Based on the planned path, the vehicle control system 404 may control the drive system 402 in order to drive the vehicle 400 along the planned path. As the vehicle 400 is driven along the planned path, the sensors 406, and/or 408a and 408b may update the vehicle control system 404 with new images of the vehicle's environment, thereby tracking the vehicle's progress along the planned path and updating the vehicle's location. In other embodiments, the vehicle control system 404 may rely in part or in whole on a user-defined path.

Since the vehicle control system 404 receives updated images of the vehicle's environment, and since the vehicle control system 404 is able to autonomously plan the vehicle's path and control the drive system 402, the vehicle control system 404 is able to determine when there is an obstacle in the vehicle's path, plan a new path around the obstacle, and then drive the vehicle 400 around the obstacle according to the new path.

According to some embodiments, the vehicle control system 404 may additionally provide a computer server. For example, the processor 414, the memory 416, the medium 418, and the communications transceiver 120 may be configured in order to provide a web server (e.g. using HTTP) which may be made available on a local-area network (LAN), wide-area network (WAN, or over the Internet. The server may be configured to provide components of the systems and methods described herein, such as for providing vehicle information to a monitoring device.

A lift appliance 422 may be attached to the vehicle 400, and may be in communication with the vehicle control system 404. The lift appliance generally includes a lift or elevator mechanism, such as a mechanism comprising any or all of a scissor lift, lead-screw, rack and pinion, telescopic lift, etc., and a linear actuator such as a hydraulic cylinder, pneumatic cylinder, motor, etc. In some cases, the lift or elevator mechanism may combine extension and actuation features, such as a helical band actuator.

The lift appliance 422 may communicate with the vehicle control system 404 so that the lift appliance 422 can be operated (e.g. raised or lowered) in coordination with other movements of the vehicle 400. For example, when the vehicle 400 travels to a particular location and stops at the location, the lift or elevator mechanism of the lift appliance 422 may be automatically raised or lowered.

The lift appliance 422 may include a payload platform, such as at the top of the lift or elevator mechanism. A payload platform is generally used to transport a payload, such as a pallet, a container, or another type of item. According to some embodiments, the size and/or shape of the payload platform may be selected in order to complement (e.g. engage with) a pick-up and drop-off stand, for example in relation to the access channel 318.

Figure 5:
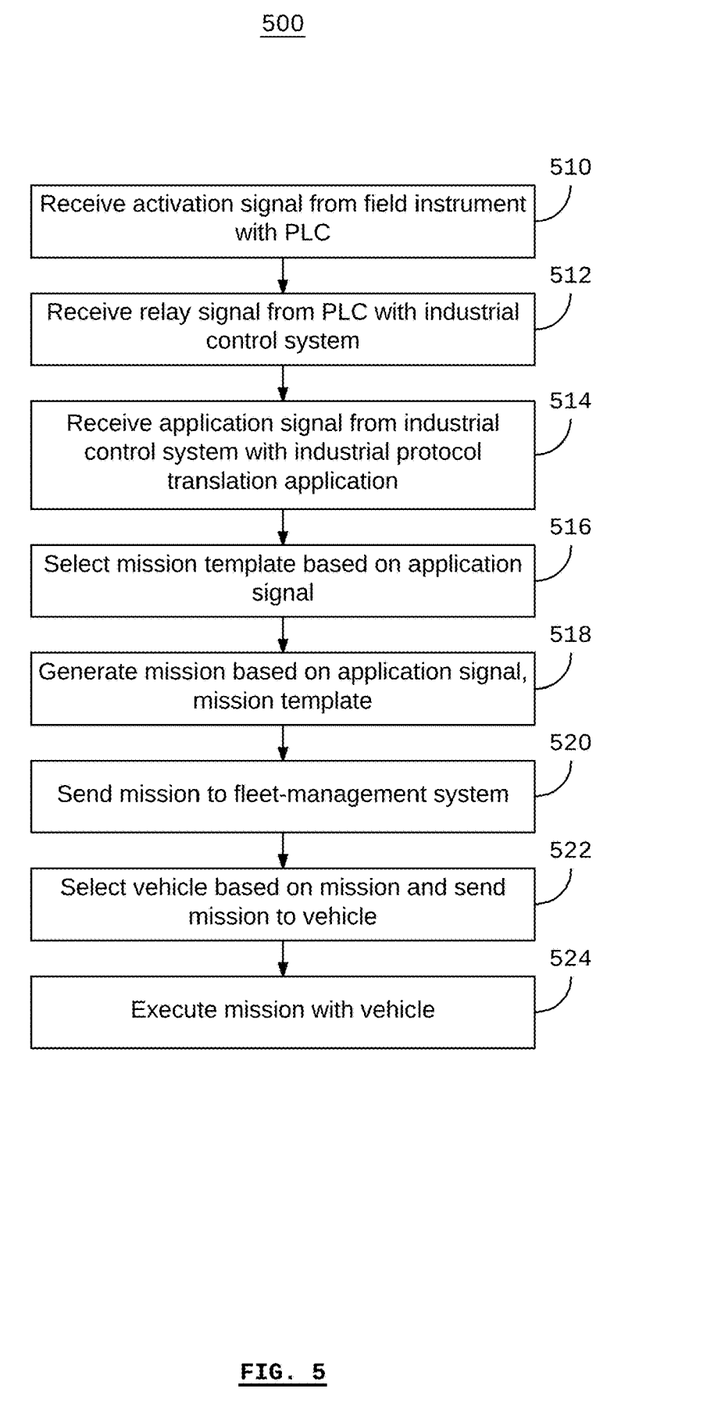
FIG. 5 is a flow diagram of a method for instructing a self-driving material-transport vehicle, according to some embodiments.

Referring to FIG. 5, there is shown a method 500 of instructing a self-driving material-transport vehicle, according to some embodiments. The method 500 may be implemented using one or more computer processors, such as those included in any or all of a self-driving material-transport vehicle, an industrial control system (e.g. on a computer terminal or server), and a fleet-management system (e.g. on a computer terminal or server). Non-transitory computer-readable media associated with one or more processors may store computer-readable instructions for configuring the one or more processors to execute the steps of the method 500.

The method 500 begins at step 510 when an activation signal is received by a PLC from a field instrument. According to some embodiments, the field instrument may include a sensor or switch such as a proximity sensor or limit switch such that the activation signal is generated based on a change in state of the sensor or switch. According to some embodiments, the field instrument may be (or be a part of) a smart pick-up-and-drop-off stand that can be used for transferring payloads on and off of a material-transport vehicle.

At step 512, a relay signal is received by the industrial control system from the PLC. According to some embodiments, the relay signal is essentially the activation signal being relayed from the field instrument to the industrial control system. According to some embodiments, the relay signal may be of the same format as the activation signal; and in some embodiments, the relay signal may be of a different format as the activation signal.

According to some embodiments, the field instrument may include a PLC, in which case, the signal is sent from the field instrument to the industrial control system or fleet management system directly from the field instrument.

At step 514 an application signal is received by an industrial protocol translation application from the industrial control system. According to some embodiments, the application signal may be an OPC-UA signal. According to some embodiments, the industrial control system may comprise a SCADA system or terminal.

According to some embodiments, the application signal may include a field-instrument identifier. For example, the field-instrument identifier may provide any or all of a unique identifier (e.g. a name), type, and location of the field instrument. According to some embodiments, if a unique identifier is provided or determined based on the activation signal and/or relay signal, the unique identifier may be used to determine the type and/or location associated with the field instrument.

At step 516, a mission template may be selected based on the application signal. For example, in the case of a smart pick-up-and-drop-off stand, the application signal may indicate that a payload has been placed on the stand (i.e. the stand was previously empty). In this case, a "pick-up" mission template may be selected. In some cases, the use of the mission template may be omitted.

According to some embodiments, the application signal may indicate that a payload has been removed from the stand, in which case the activation signal and relay signal may be used to inform the industrial control system and/or the fleet-management system that a pick-up event has occurred (e.g. update mission status or progress), and/or identify that the stand is now available to receive a new payload.

According to some embodiments, the mission template may comprise a text file, string data, and/or be based on a REST or RESTFul protocol, web service, or API.

At step 518, a mission is generated based on the application signal. According to some embodiments, the mission may be generated based on the mission template. At step 520, the mission is sent to the fleet-management system, for example, as may be running on a computer server.

At step 522, a particular vehicle from within a fleet of vehicles may be selected for execution of the mission. For example, if the activation, relay, and/or application signals indicate that a pick-up-and-drop-off stand has become available (i.e. empty), then a vehicle carrying a particular payload may be selected to drop off the payload at the pick-up-and-drop-off stand. In the activation, relay, and/or application signals indicate that a payload has been placed on a pick-up-and-drop-off stand, then a vehicle may be selected to pick up the payload, for example, based on the type of lift mechanism that the vehicle is equipped with, and its compatibility with the payload and/or stand.

Once a vehicle has been selected, the mission is sent to the vehicle with the fleet-management system. At step 524, the mission is executed with the selected vehicle.

The present invention has been described here by way of example only. Various modification and variations may be made to these exemplary embodiments without departing from the spirit and scope of the invention, which is limited only by the appended claims.

We claim:

1. A system for instructing a self-driving material-transport vehicle within an industrial facility, comprising:
   a programmable logic controller;
   one or more field instruments in communication with the programmable logic controller, each field instrument being positioned at a different location within the industrial facility; and
   an industrial control system processor operable to:
      receive an activation signal from the one or more field instruments following a triggering condition occurring within the industrial facility detected by the one or more field instruments;
      generate an application signal based at least on the activation signal, the application signal comprising mission data to enable an industrial protocol translation application to generate a mission in response to the triggering condition; and
      initiate the industrial protocol translation application to:
         select a mission template based at least on the application signal, the mission template comprising a set of instructions for operating the self-driving material-transport vehicle to perform a task identified by the application signal;
         generate a mission, based on the application signal and the selected mission template, for the self-driving material-transport vehicle; and
         transmit the mission to a fleet management system for instructing the self-driving material-transport vehicle.

2. The system of claim 1, further comprising the self-driving material-transport vehicle in communication with the industrial control system processor.

3. The system of claim 1, wherein the application signal is based on OPC-UA.

4. The system of claim 1, wherein the mission template is based on a REST protocol.

5. The system of claim 1, further comprising a smart pickup-and-drop-off stand comprising a field instrument of the one or more field instruments.

6. A method for instructing a self-driving material-transport vehicle within an industrial facility, comprising:
   receiving, at an industrial control system processor, an activation signal from one or more field instruments following a triggering condition occurring within the industrial facility;
   generating, by the industrial control system processor, an application signal based on the activation signal, the application signal comprising mission data to enable an industrial protocol translation application to generate a mission in response to the triggering condition; and initiating, by the industrial control system processor, the industrial protocol translation application to:
- select a mission template based at least on the application signal, the mission template comprising a set of instructions for operating the self-driving material-transport vehicle to perform a task identified by the application signal;
- generate a mission, based on the application signal and the selected mission template for the self-driving material-transport vehicle; and
- transmit the mission to a fleet management system for instructing the self-driving material-transport vehicle.

7. The method of claim 6, further comprising the step of executing the mission with the self-driving material-transport vehicle.

8. The method of claim 6, wherein the application signal is based on an OPC-UA protocol.

9. The method of claim 6, wherein the activation signal comprises a field-instrument identifier, and generating the mission comprises determining a mission location based on the field-instrument identifier.

10. The method of claim 6, comprising the preliminary step of receiving the activation signal from the one or more field instruments with the programmable logic controller.

11. The method of claim 10, wherein a field instrument of the one or more field instruments is part of a smart pick-up-and-drop-off stand, such that the activation signal is generated by the smart pick-up-and-drop-off stand based on a change in a payload on the smart pick-up-and-drop-off stand.

12. A non-transitory computer-readable storage medium storing computer-executable instructions that, when executed by an industrial control system processor, configure the industrial control system processor to perform operations comprising:
- receiving an activation signal from one or more field instruments following a triggering condition occurring within an industrial facility in which a self-driving material-transport vehicle operates;
- generating an application signal based on the activation signal, the application signal comprising mission data to enable an industrial protocol translation application to generate a mission in response to the triggering condition; and
- initiating the industrial protocol translation application to:
  - select a mission template based at least on the application signal, the mission template comprising a set of instructions for operating the self-driving material-transport vehicle to perform a task identified by the application signal;
  - generate a mission, based on the application signal and the selected mission template, for the self-driving material-transport vehicle; and
  - transmit the mission to a fleet management system for instructing the self-driving material-transport vehicle.

13. The medium of claim 12, wherein the application signal is based on OPC-UA.

14. The medium of claim 12, wherein the mission template is based on a REST protocol.

15. The medium of claim 12, wherein the activation signal comprises a field-instrument identifier, and the computer-executable instructions configure the industrial control system processor to determine a mission location based on the field-instrument identifier.

16. The system of claim 1, wherein the activation signal comprises a field-instrument identifier, and the computer-executable instructions configure the industrial control system processor to determine a mission location based on the field-instrument identifier.

17. The system of claim 1, wherein the mission template comprises a text file or a string data.

18. The system of claim 1, wherein the instructions further comprise instructions that, when executed, configure the industrial control system processor to query the programmable logic controller to determine a state of the programmable logic controller.

19. The system of claim 1, wherein the instructions further comprise instructions that, when executed, configure the industrial control system processor to write information to the programmable logic controller based on a status of the mission or the self-driving material-transport vehicle.

20. The system of claim 1, wherein the instructions further comprise instructions that, when executed, configure the industrial control system processor to determine a value of a variable in the mission template based on the application signal.

* * * * *